United States Patent [19]

Ether

[11] 4,189,293
[45] Feb. 19, 1980

[54] EXTRUSION HEAD

[75] Inventor: Theodore L. Ether, South Bend, Ind.

[73] Assignee: Uniroyal, Inc., New York, N.Y.

[21] Appl. No.: 891,672

[22] Filed: Mar. 30, 1978

[51] Int. Cl.$^2$ ............................................. B29D 23/04
[52] U.S. Cl. ................................ 425/376 A; 264/146;
425/380; 425/461; 425/466; 425/467
[58] Field of Search ............... 425/376 A, 461, 467,
425/380, 381, 466; 264/176, 172, 146

[56] References Cited
U.S. PATENT DOCUMENTS

| | | | |
|---|---|---|---|
| 2,468,585 | 4/1949 | Bluma | 264/209 |
| 3,145,419 | 8/1964 | Reifenhauser | 425/466 |
| 3,384,925 | 5/1968 | Rothemeyer | 425/461 |
| 3,611,492 | 10/1971 | Scheibling | 264/172 |
| 4,116,605 | 9/1978 | Burrell | 425/467 |
| 4,118,166 | 10/1978 | Bartrum | 264/171 |

Primary Examiner—Donald J. Arnold
Attorney, Agent, or Firm—Norbert P. Holler

[57] ABSTRACT

This invention discloses an extruder head having a cavity whose shape can be visualized with reference to a model. The model is a circular tube having a wall thickness which is constant at any given distance from one end. The tube is split longitudinally at or near one end and unfolded gradually into the form of a flat sheet at the other end. Extrudate which enters the cavity in a solid, circular cross-sectional configuration is shaped into the form of the unsplit portion of the model by a mandrel in an entrance zone. A divider splits the extrudate longitudinally. The cavity continues as a transition zone in which the split tube of extrudate is unfolded gradually to become a flat sheet in an exit zone. Variations in the shape of the cavity in the exit zone are presented in which the extrudate is formed into shapes more complex than the flat sheet.

6 Claims, 20 Drawing Figures

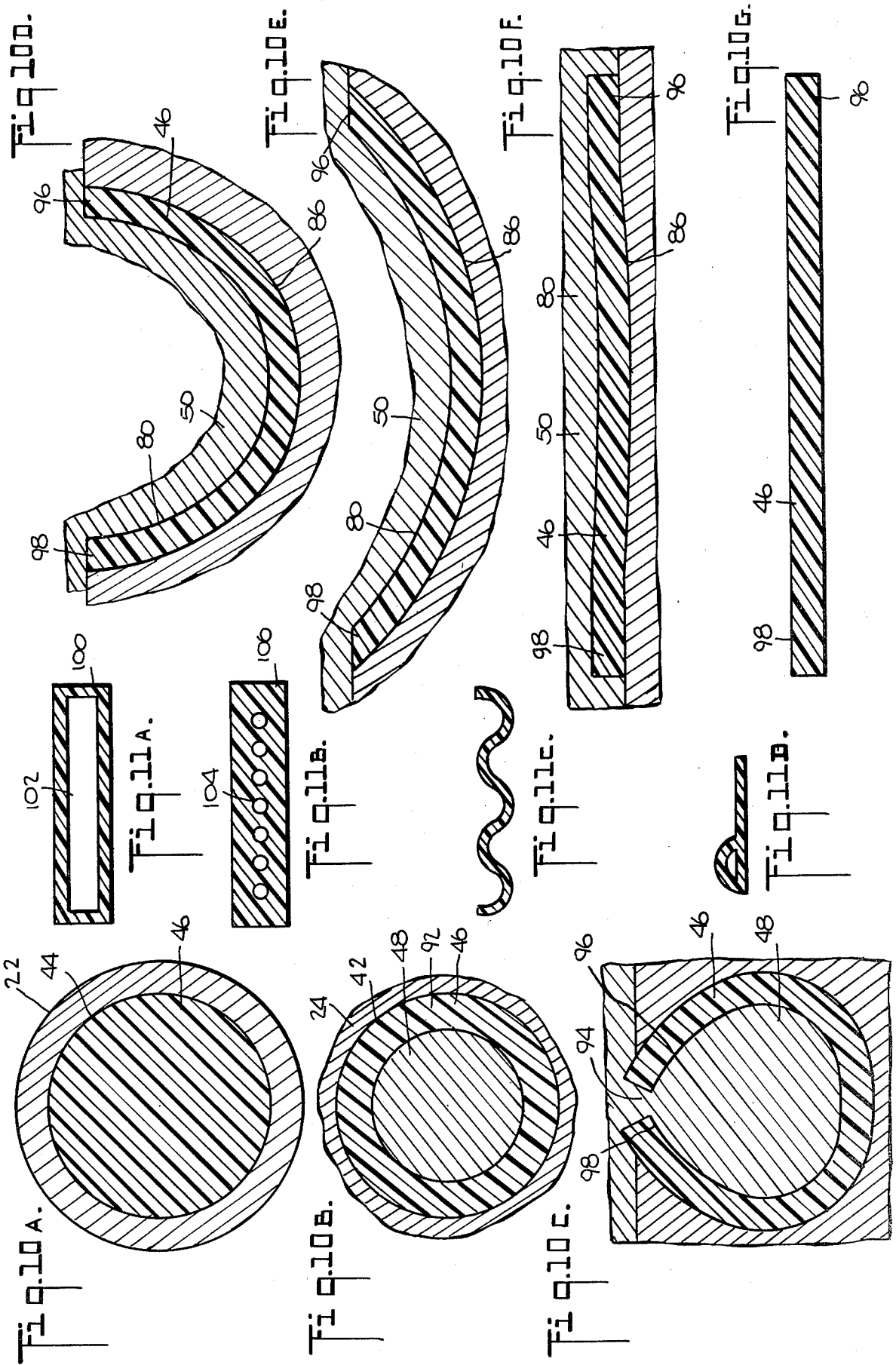

EXTRUSION HEAD

BACKGROUND OF THE INVENTION

1. Field of Invention

The invention relates to extrusion apparatus and more particularly to extrusion heads through which extrudate may be supplied with constant shear history and under constant pressure to all points in the entrance to a die.

2. Prior Art

It has long been recognized in the extruding art that it is necessary to supply to all points behind a rectangular die extrudate having the same shear history and the same pressure if the extruded product is to have the same shape as the die. In conventional designs the extruder will feed a rod of material through an extrusion head in which the material is squeezed and spread out into, for instance a flat sheet which is much wider than the diameter of the rod. In this case, the material which reaches the die entrance varies in pressure from the center of the die to its extremities. This pressure variation results from a variation in pressure drop experienced due to differences in the distance of flow to each die entry point. Accordingly, to equalize the extrudate pressure at all points in the die entry region restrictions are introduced into the extruder cavity as required. Equal pressure may thereby be approximated in the extrudate in the die entry region by this complex and somewhat trial and error procedure, but to achieve this non-equal shear history is involved. In the extreme, this may cause problems due to excessive heat generation in certain portions of the extrudate. In general, it introduces variations in the degree of swelling experienced as the extrudate leaves the die. Non-uniform die swell does not permit the extrudate to retain the uniform sheet thickness produced by the die.

Optimally, the flow of extrudate should be guided within the extrusion head so that it is non-divergent. All elements of extrudate will then experience the same total flow path, the same shear history and the same pressure drop as they pass through the head. Those requirements are uniquely provided almost precisely in extruder heads designed to produce wide, flat sheets by the teachings of this invention.

In U.S. Pat. No. 3,384,925 there is disclosed a sheet extruding head for extruding thermoplastic synthetic resins which attempts to completely equalize the flow of extruded material in the extruding head. The extruding head is designed specifically with an infinite number of flow lines, each flow line of equal length, so that each particle in the extrusion process traveling along its own flow line will travel the same distance as every other particle from the point of entering the extrusion head to the point of exiting the extrusion head. This is accomplished essentially through an arched equalizing zone between the entry and exit points. This design however does not permit symmetrical flow and does not provide a constant flow path through the head. The design disclosed therein includes a fan shaped entry region in which the flow of material is divergent. In addition the design requires rather sharp changes in the direction of flow at the entrance to and the exit from the arched equalizer zone, especially at its central area, which will affect the extrudate.

The extrusion heads which have heretofore been designed along the above principles, do not meet the basic requirements for permitting total symmetrical flow and a constant flow path from the end of an extruder screw chamber through the extrusion head to a die.

It it towards elimination of these and other problems in the prior art that the present invention is directed.

SUMMARY OF THE INVENTION

1. Purposes of the Invention

It is an object of the present invention to provide an extrusion head cavity designed so that every particle in the extrudate undergoes the same pressure drop, the same shear history, and the same distance of travel from its point of entry into the extrusion head to its point of exit from the extrusion head.

It is another object of the present invention to provide an extrusion head cavity in which the particles of extrudate are subjected to a gradual curvature along their paths of travel.

Still another object of the present invention is to provide an extrusion head cavity which provides totally symmetrical flow and a constant flow path from the entry to exit points of the extrusion head.

Still other objects of the present invention in part will be obvious and in part will be apparent as the description proceeds.

2. Brief Description of the Invention

Generally, the above and other objects of the present invention are accomplished by providing an extrusion head with a cavity having a cylindrical entrance zone through which extrudate from an extruder screw chamber is introduced into the extrusion head. The extrudate, which may be a rubber-like material, assumes a solid circular cross-sectional configuration in this region. A mandrel is positioned within the entrance zone to shape the extrudate into an annular cross-sectional configuration having for instance constant wall thickness. The extrudate is then slit along its longitudinal axis by a divider. The wall of the slit extrudate tube is then unfolded into a flat sheet in a transition zone. The transition zone has top and bottom wall surfaces which are shaped from a pattern formed from a gradually flattened split tube having a wall thickness equal to that of the split annular extrudate. Such a transition zone provides non-divergent flow and constant flow paths for the material from the point of entry into the extrusion head to the exit point thereof.

The wall surfaces in the transition zone may be spaced a distance measured perpendicularly to the wall surfaces at every point which is equal to the wall thickness of the annular extrudate; producing an extrudate at the exit zone which has a thickness equal to that of the annular extrudate in the entrance zone. Alternatively, the spacing between the wall surfaces in the transition zone may vary along the path of extrudate flow, while being maintained constant normal to the direction of flow at all points equidistant from the entrance end of the extruder cavity along the extrudate flow paths.

The invention consists of the features of construction and arrangement of parts which will be detailed hereinafter and described in the appended claims.

BRIEF DESCRIPTION OF THE DRAWINGS

While the specification concludes with claims particularly pointing out and distinctly claiming the subject matter regarded as the invention herein, it is believed that the invention will be better understood from the following description when read in conjunction with the accompanying drawings, in which:

FIGS. 10A through 10G represent sections taken substantially along the lines 10A—10A to 10G—10G respectively of FIG. 5 normally to the wall surfaces in the cavity and illustrate the cross-sectional configuration assumed by the extrudate at various points in the extrusion head; and FIGS. 11A through 11D are cross-sectional representations of other types of extrudate formed in modified extrusion heads constructed in accordance with the present invention.

DESCRIPTION OF THE PREFERRED EMBODIMENTS

Figure 1:
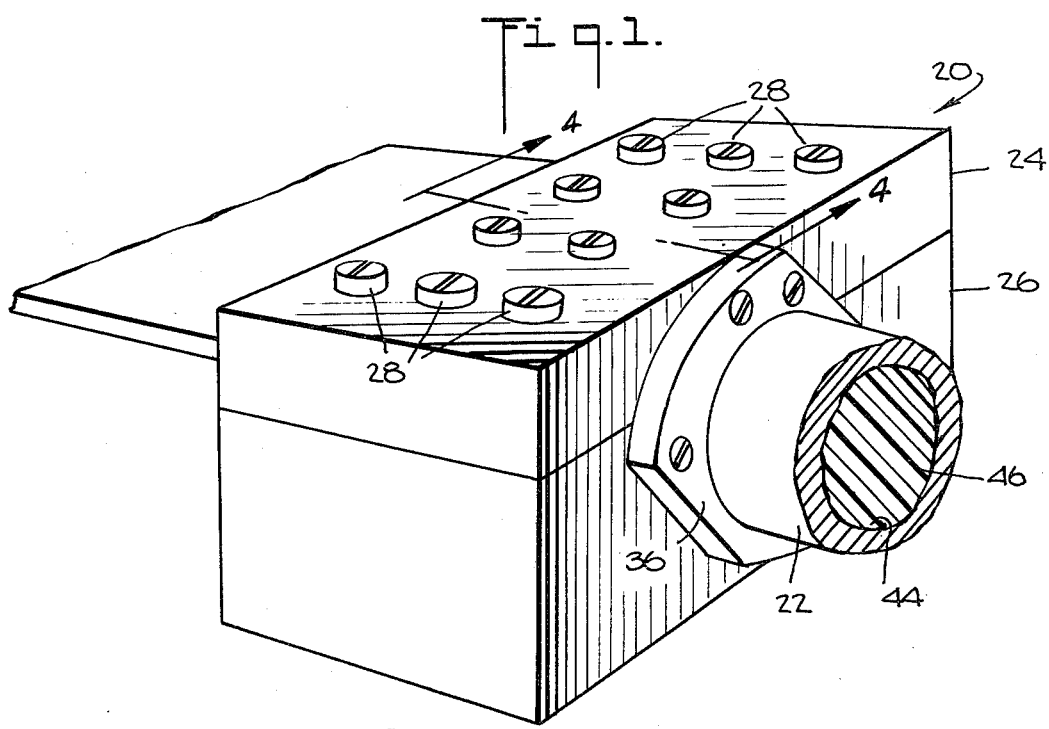
FIG. 1 is a perspective view of an extrusion head constructed in accordance with the present invention.
Figure 3:
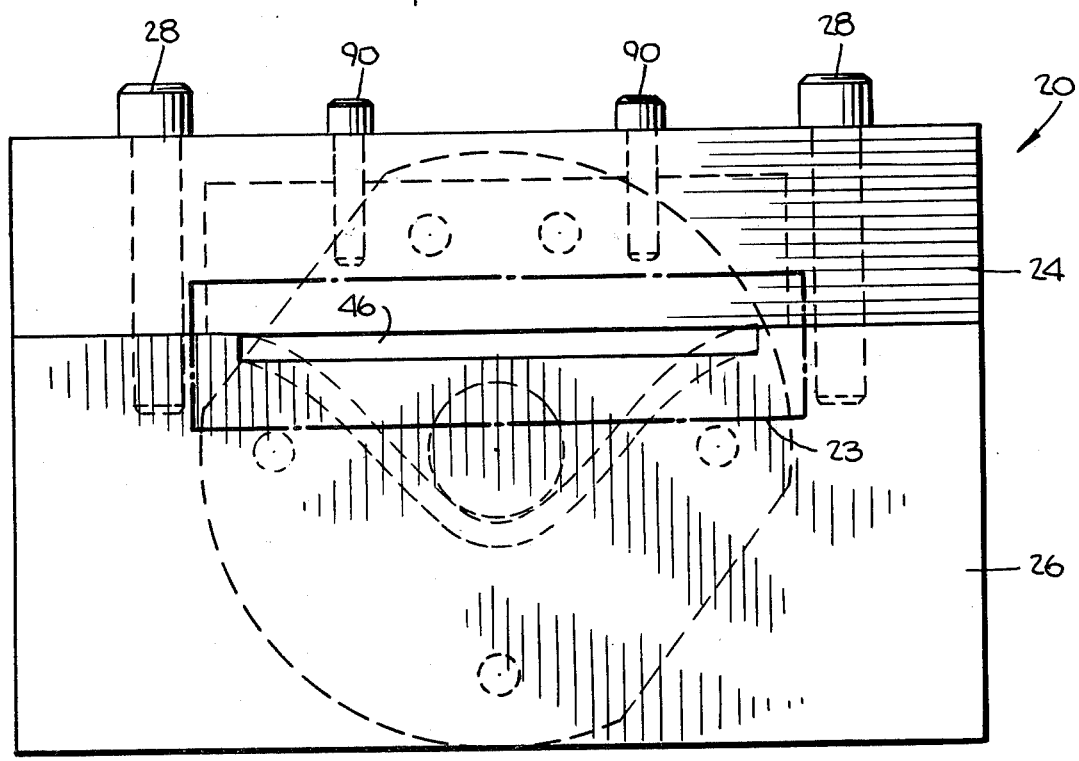
FIG. 3 is a view of the extrusion head of FIG. 1 looking into the exit zone thereof.

With reference to the drawings, there is illustrated in FIG. 1 an extrusion head constructed in accordance with the present invention and identified generally by the reference numeral 20. As will be readily understood by those skilled in the art, extrusion heads are used with extruders and are located at the discharge end of an extruder screw chamber. For the sake of clarity, the extruder screw chamber with which the extrusion head 20 is used is not shown in its entirety; however, the discharge end of such an extruder screw chamber is identified by the reference numeral 22. Furthermore, extrusion heads are associated generally with dies having various cross-sectional configurations. In as much as the extrusion head of the present invention can be employed with dies of various configurations as will be described hereinafter, only the position of the die with respect to the extrusion head 20 is shown and is identified by dash-dot lines 23 in FIGS. 3 to 5 of the drawings.

The extrusion head 20 includes an upper housing 24 and a lower housing 26 which are secured to one another by means of fasteners 28 as shown. The extrusion head 20 has an internal cavity which may be divided generally, into three zones, i.e., an entrance zone 30, a transition zone 32 and an exit zone 34, all of which will be described hereinafter in detail.

Figure 4:
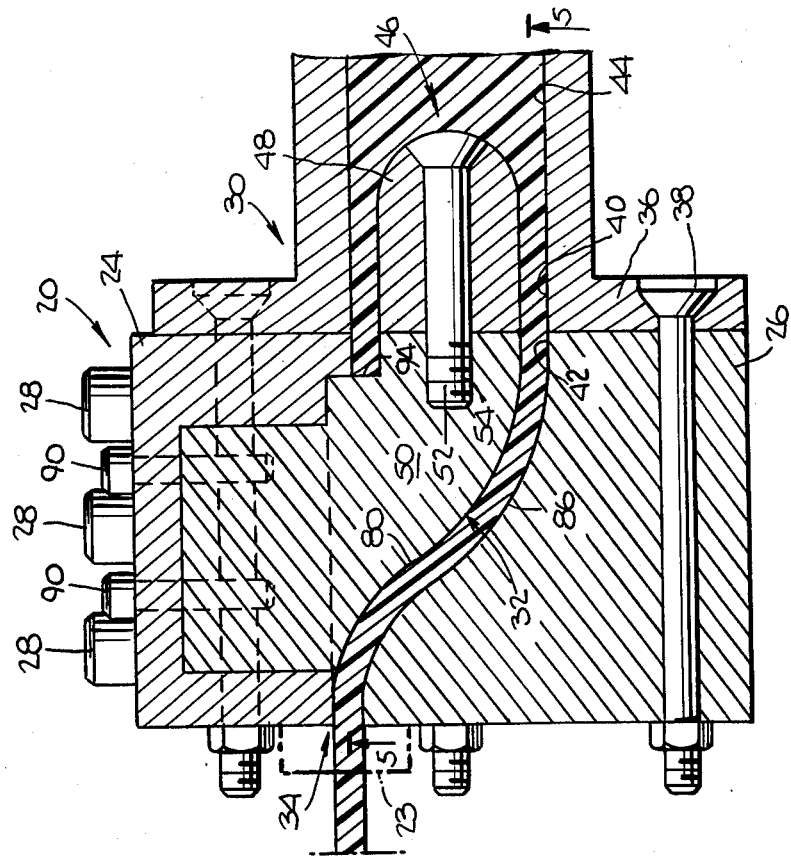
FIG. 4 is a partial sectional view taken substantially along the lines 4—4 of FIG. 1.
Figure 5:
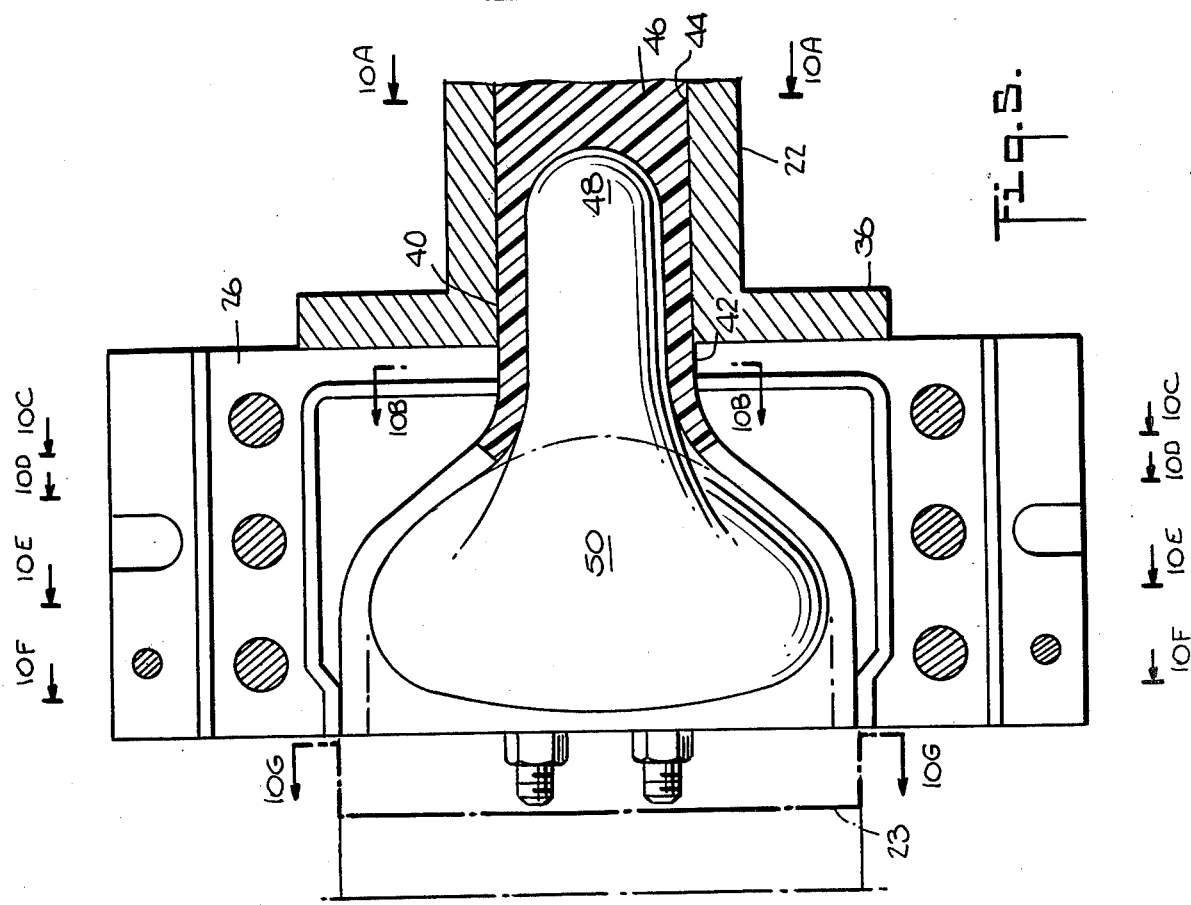
FIG. 5 is a partial sectional view taken substantially along the lines 5—5 of FIG. 4.

As can best be seen in FIGS. 4 and 5, a plate 36 is secured to the upper housing 24 and the lower housing 26 by means of fasteners 38. The plate 36 has a passage 40 therethrough which is in registry with a passage 42 in the lower housing 26. As shown in the drawings, the plate 36 may be integrally formed with the discharge end 22 of the extruder screw chamber. The internal passage 44 of the screw chamber has a generally circular cross-sectional configuration preferably matching in diameter, the diameter of passages 40 and 42. The extrudate identified generally by the reference numeral 46 in FIG. 4, which is discharged from the extruder screw chamber 22 under pressure, therefore, assumes a generally circular cross-sectional configuration upon its entry into the extruder head 20. The extrudate 46 may be a composition including relatively significant amounts of rubber.

With continued reference to FIG. 4, located at the entrance zone 30 is a mandrel or projection 48 which operates on the extrudate 46 to change it from a solid rod-like mass to a generally annular or tubular form as the extrudate passes through the entrance zone. The projection is positioned along the axial center line of the passageway formed by passages 40, 42 and 44 so that the wall thickness of the extrudate 46 is constant at all points along a circumference thereof. The projection 48 is secured to a male internal wall portion 50 of the upper housing 24 by means of a threaded shaft 52 which is received in a tapped hole 54 in the male portion 50. Alternatively, it could be formed integrally with the male portion 50.

A concept of the present invention is to provide at the exit zone 34 of the extrusion head 20 extrudate in a flat sheet configuration. It is desired that the cavity in the extruder head 20 be designed so that each particle of the extrudate appearing in the entrance zone 30 and later in the exit zone 34 travels the same distance and is subject to the same pressure drop and shear history as every other particle within the extrudate.

Figure 8:
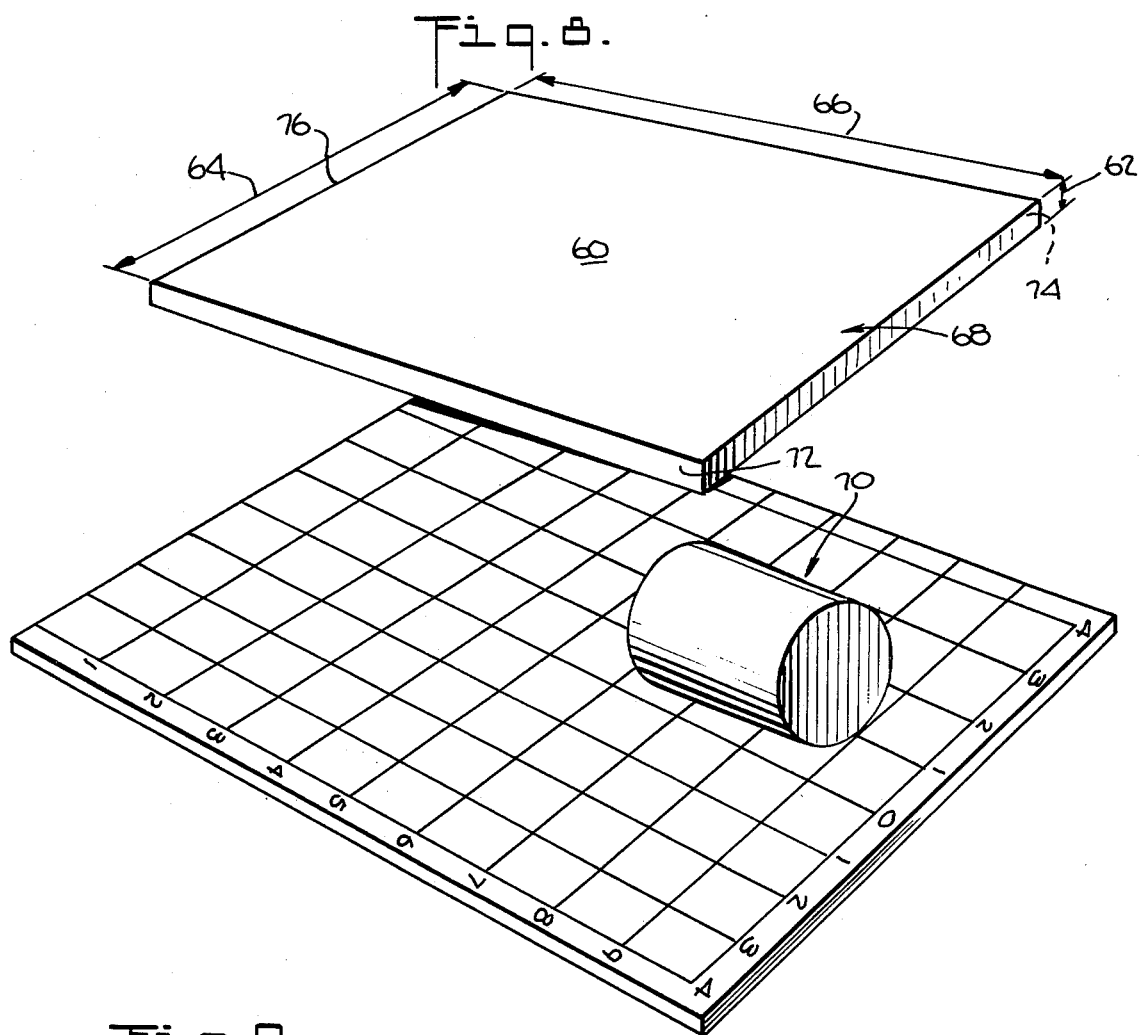
FIGS. 8 and 9 illustrate schematically the method for obtaining the contours of the female and male portions of the extrusion head.
Figure 9:
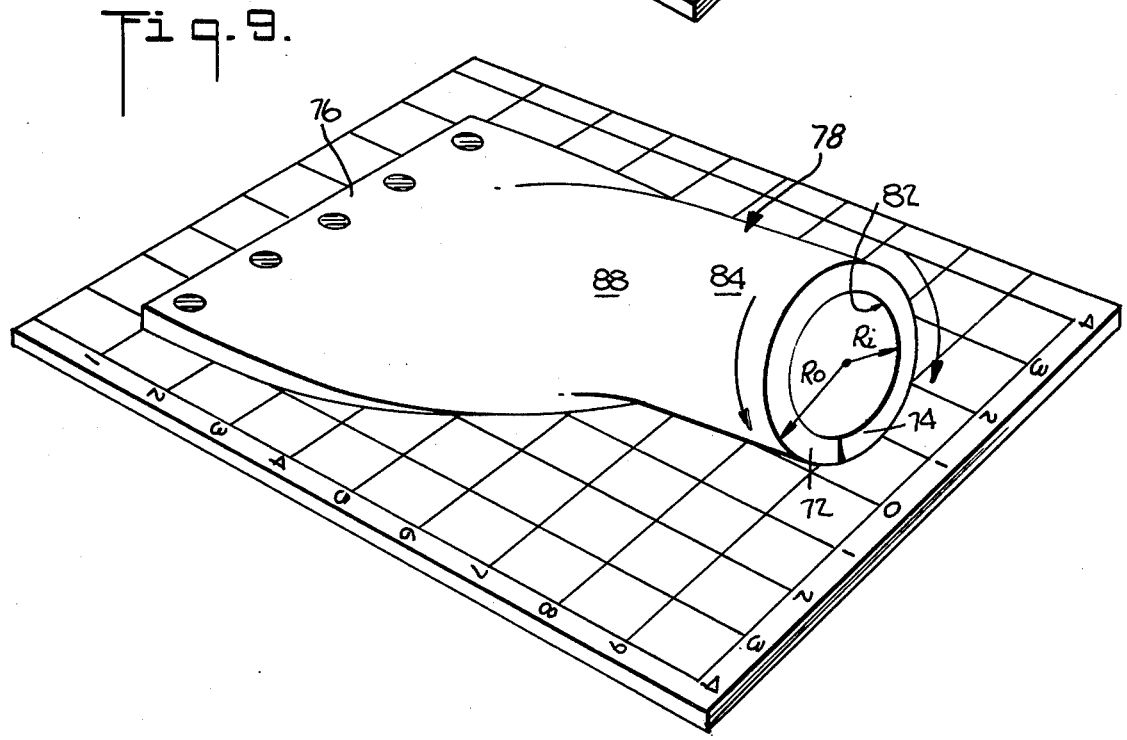

It has been found that this object can be accomplished by designing the wall surfaces of the cavity in the following manner. With reference to FIGS. 8 and 9, a piece of soft flexible material identified generally in FIG. 8 by the reference numeral 60 having a thickness 62 and a width 64 matching the desired thickness and width of the extrudate and of a length 66 approximately one and one-half times the width 64 is used to create a pattern. The end portion 68 is formed into a right circular cylinder such as by rolling the end portion about a cylindrical object 70 so that the edges 72 and 74 on the end portion abut each other. The edges for a length of perhaps one-third the length 66 are then fastened together by a suitable adhesive. Once the adhesive has set, the other end portion 76 of the sheet 60 is then unfolded and placed on a flat surface and secured thereto by suitable fastening means as shown in FIG. 9. The result is a pattern 78 which could be characterized as a tube of constant wall thickness having a portion of its wall split and being deformed to a flat sheet. It has been found that the pattern 78 is the shape that the extrudate must assume in the extrusion head 20 to meet the desired extrusion criteria set forth elsewhere herein.

Figure 6:
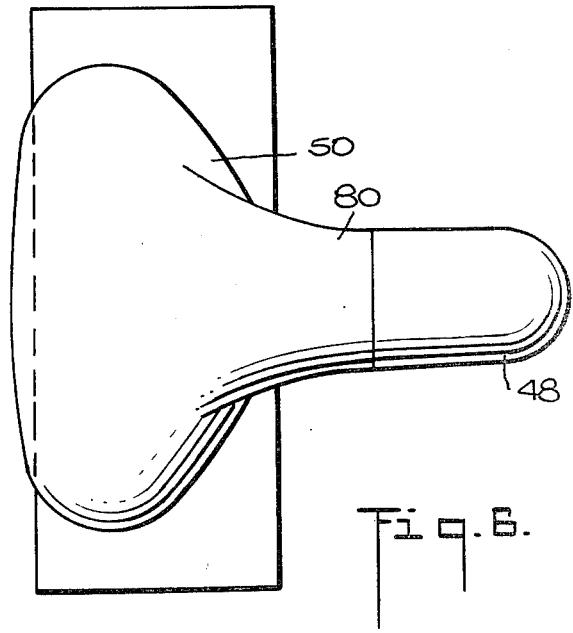
FIG. 6 is an enlarged plan view of the male portion of the extrusion head.
Figure 2:
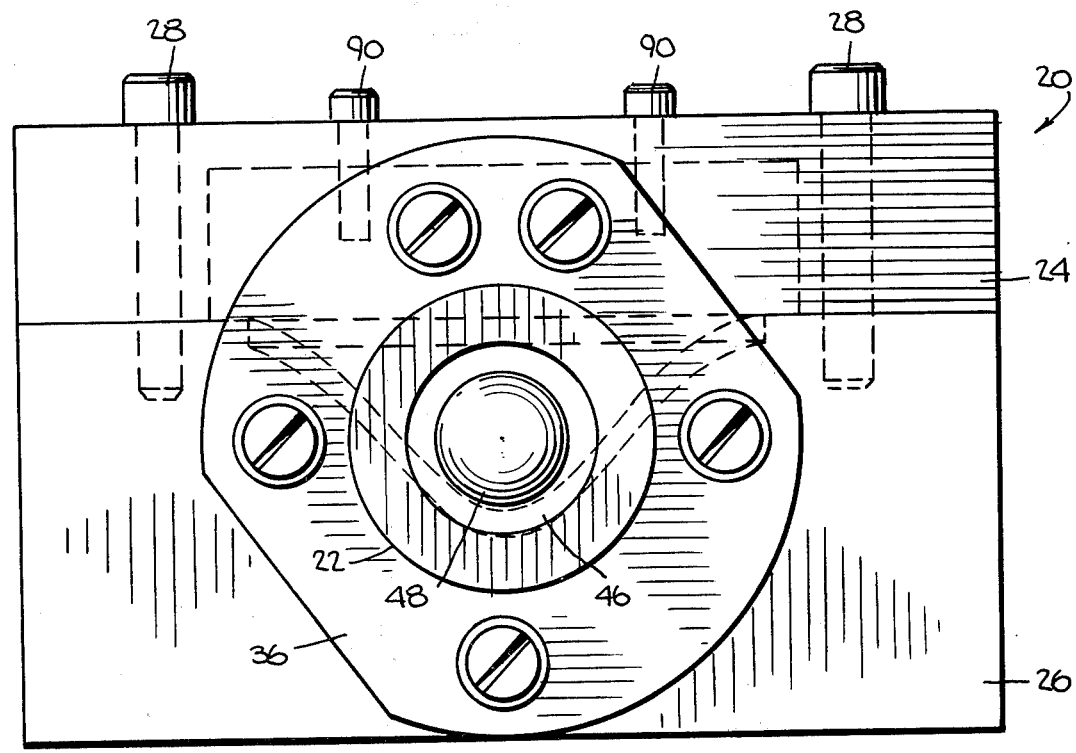
FIG. 2 is a view of the extrusion head of FIG. 1 looking into the entrance zone of the extrusion head.

With reference to FIG. 6, the male portion 50 has a first wall surface 80 which conforms to the contour of the inner wall surface 82 of the pattern 78, i.e., it represents the shape of the internal wall of a tube which is gradually unfolded into a flat sheet. The projection 48 constitutes a general extension of the wall surface 80, and its diameter is equal to the inside diameter of the tubular end portion 84 of the pattern.

Figure 7:
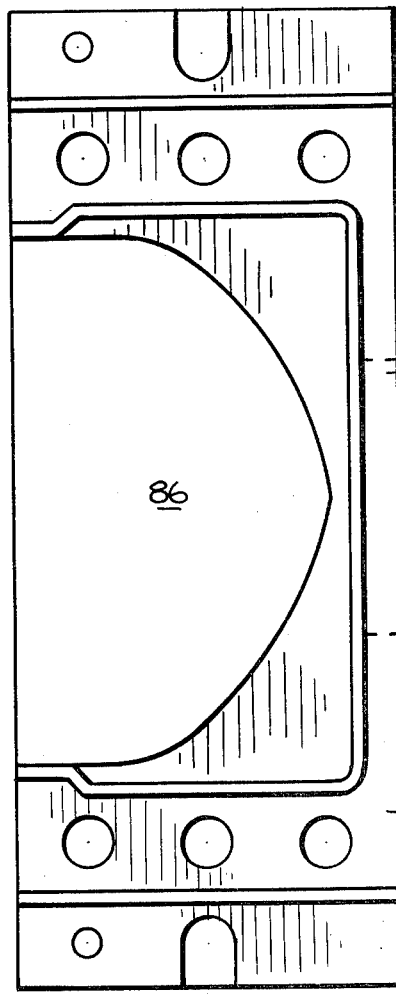
FIG. 7 is an enlarged plan view of the female portion of the extrusion head.

The female portion of the cavity which has a second wall surface 86 of a shape corresponding to the exterior wall surface 88 of the pattern 78 may be integrally formed with the lower housing 26 as shown in FIG. 7.

When the extrusion head 20 is assembled, the male portion 50 is secured to the upper housing by fasteners 90. The projection 48 on the male portion 50 is inserted through the opening 42 in the lower housing and into the passages 40 and 44. The first wall surface 80 on the male portion 50, the second wall surface 86 on the lower housing 26, and the interior walls of the passages 40, 42 and 44 create a cavity within the extrusion head 20 having configurations identical to the pattern 78.

It should be noted that the contours of the first and second wall surfaces 80 and 86 can be created from the pattern 78 by any known manufacturing methods such as machining or casting and such manufacturing methods form no part of the present invention.

There are shown in FIGS. 10A through 10G the contours of the first and second wall surfaces 80 and 86 of the cavity as well as the cross-sectional configuration assumed by the extrudate 46 at various points within the extrusion head 20. FIG. 10A is a cross-section of the extrudate 46 as it passes into the entrance zone 30. As noted hereinabove, the extrudate 46 assumes a solid rod-like configuration within the passage 44.

FIG. 10B represents the cross-sectional configuration of the extrudate 46 as it passes around the projection 48. At this point, the extrudate has a tubular configuration with a wall 92 of constant thickness at any circumference.

FIG. 10C represents the cross-sectional configuration assumed by the extrudate 46 immediately after the tubular wall 92 is slit longitudinally by a divider 94 (FIG. 4) located on the male portion 50 at a point where the first and second surfaces 80 and 86 begin to assume the gradually unfolded annular configuration. The portions 96 and 98 of the split wall pass between the wall surfaces and begin to separate, or unfold as shown.

FIGS. 10D, 10E and 10F represent successively, the cross-sectional configurations of the extrudate as it is gradually flattened into a flat sheet between the first and second wall surfaces 80 and 86 until the extrudate has the form shown in FIG. 10G at the exit zone 34 of the extrusion head.

It has been found that by designing the first and second wall surfaces 80 and 86 by working from a pattern created from a flexible sheet of material as described hereinabove, each particle in the extrudate will undergo the same pressure changes, the same dwell time within the extrusion head, and the same shear history. Consequently, the sheet of extrudate appearing at the exit of the extrusion head is uniform in thickness.

As noted hereinabove, the extruder head is designed by considering a transition zone formed by deforming a simple right circular tube. The above discussion set forth the mechanics of creating such an extrusion head. There follows a discussion of the flow characteristics of such an extruder head.

Returning to FIG. 9, the right circular tube formed by folding the edges 72 and 74 together has a wall thickness of $R_o - R_i$ where $R_o$ and $R_i$ are the outer and inner radii of the tube. The tube has a length 66 of L. Generally, the extrudate will flow through the extrusion head in a manner substantially the same as if it were flowing through an undeformed tubular channel of the same length and radii. This assumes, however, that there are negligible edge effects as the extrudate travels through the head. Consequently, the flow rate Q, in cm³/sec, can be expressed as:

$$Q = \frac{\pi(R_o + R_i)(R_o - R_i)^3 P}{12\mu_a L} \quad (1)$$

wherein P is the pressure drop through the extrusion head and $\mu_a$ is the apparent viscosity of the extrudate.

Assuming for the moment that $R_o$ and $R_i$ are constant along the length of the "tube", a single constant shear rate, $v$, will exist which is given by:

$$v = \frac{KQ}{\pi(R_o + R_i)(R_o - R_i)^2} = \frac{KQ}{\pi(R_o^2 - R_i^2)(R_o - R_i)} \quad (2)$$

where K is a constant which depends upon the degree of non-newtonian behavior of the extrudate and has a value of from 5 to 6.

Since the volume of the "tube" is its cross-sectional area times its length and the volume rate of flow is Q, the dwell time of the material in the head, T, is given by:

$$T = \frac{\pi(R_o^2 - R_i^2) L}{Q} \quad (3)$$

This may also be expressed in terms of the shear rate as:

$$T = \frac{KL}{v(R_o - R_i)} \quad (4)$$

by inserting the value of Q from equation (2) into equation (3). Thus, for extrusion heads designed in accordance with the concepts of the present invention, the dwell time will be constant if $v$ is a constant and $L/(R_o - R_i)$ is constant. Furthermore, equation (1) can be rearranged and solved for the pressure drop to obtain $$P = 12\mu_a \frac{v}{K} \cdot \frac{L}{R_o - R_i} \quad (5)$$

which shows that the pressure drop will also be constant for extrusion heads having constant shear rates and values of $L/(R_o - R_i)$. Therefore, it is shown that if extrusion heads are designed in accordance with the present invention to produce the same shear rate and have the same value of $L/(R_o - R_i)$ the dwell times and pressure drops will be the same. It can also be shown that the shear stresses will be the same. Consequently, shear rate and $L/(R_o - R_i)$ are the scaling factors which preferably should be held constant.

It has also been found that the value of L is not unalterable, and L could be less than $\pi(R_o + R_i)$ if necessary.

Should the wall thickness of the tube diminish linearly from one end to the other, equation (5) above can be rewritten as:

$$P = \frac{12\mu_a Q L}{2\pi(R_o + R_i)} \frac{(h_e + h_d)}{(h_e \cdot h_d)^2}$$

wherein $h_e$ is the wall thickness of the tube at the entrance zone and $h_d$ is the wall thickness at the exit zone.

While the extrudate 46 appearing at the exit zone 34 is a flat sheet, an extrudate 100 (FIG. 11A) having rectangular box-like cross-sectional shape with a central opening 102 and constant wall thickness may be formed with an appropriately configured die from a sheet of controlled thickness arriving at the exit zone and itself formed from a slit and unfolded tube as herein described.

The teachings of the present invention have value for extrusions in other forms than sheets of controlled thickness. For example, in the melt spinning of multifilament yarns, the filaments are generally made by forcing melted polymer extrudate through a large number of small apertures in a metal plate or spinnerette. These small apertures are distributed in some pattern over most of the face of the generally round plate. The result is that the flow path through the extrusion head to each aperture is somewhat different and variations in efflux rate can be found from aperture to aperture. The molten filaments emerging from the apertures fall downward vertically from the spinnerette, solidify by cooling and are gathered together on a pull roll at some point after solidification. This process creates non-uniformity in the yarn because non-uniform flow may occur from the many apertures and because of the difficulty in cooling the circular bundle of filaments uniformly so that they all solidify at the same distance from the spinerette face.

In a multifilament spinning line in which the teaching of this invention could be employed to design the extrusion head, the apertures 104 (FIG. 11B) would be placed side by side across the width of a straight die or spinnerette (not shown). The pressure would be constant across the expanse of the die because the polymer would be arriving in the form illustrated at 106, and the polymer would thus extrude at equal rates from all apertures. The emerging filaments would fall vertically downward, side by side, like a flat sheet and cooling could be controlled to produce solidification of each filament at the same distance from the die. Thus conditions for improved uniformity would be met.

FIGS. 11C and 11D illustrate some representative more complex cross-sections for the extrudate which may be produced by obvious modification of the geometry of the transition and exit zones in an extruder head designed in accordance with the teachings of the invention.

In the situations illustrated in FIGS. 11C and 11D, the transition and exit zones are designed so that the extrudate is shaped into a cross-sectional configuration at the exit zone compatible with the cross-sectional configuration of the die. For instance, in FIG. 11C the extrudate is shaped into the wave form shown. The contours of the wall surfaces 80 and 86 in extrusion heads used for these applications are derived from a pattern 78 created from a tube unfolded into the particular shape desired for the extrudate at the exit zone.

In addition it should be noted that while the wall thickness of the annular extrudate in the entrance zone should always be constant in a direction normal to the direction of flow, it may vary along the direction of flow.

It can thus be seen that the objects of the present invention namely, to provide extrudate having constant shear history and pressure to a die at all points across the die have been accomplished by a cavity within an extrusion head including an entrance zone in which the extrudate assumes a solid rod-like configuration. A mandrel within the entrance zone shapes the extrudate into a tubular cross-sectional configuration. The wall of the tubular extrudate is then divided longitudinally and gradually flattened within the extrusion head so that, at the exit region of the extrusion head the extrudate has the form of a flat sheet or other desired configuration. Various dies may be positioned at the exit zone to receive the extrudate.

The cavity within the extrusion head begins as a single right circular cylindrical tube, and continues as a tube split longitudinally and gradually unfolded into a flat sheet.

While in accordance with the patent statutes preferred and alternative embodiments have been described in detail, it is to be understood that the invention is not limited thereto or thereby.

What is claimed is:
1. An extrusion head comprising:
  (a) first means defining a cylindrical entrance zone through which extrudate is introduced into said extrusion head in the form of a solid cylindrical rod;
  (b) second means arranged axially within said entrance zone for shaping said extrudate into an annular cross-sectional configuration of substantially uniform wall thickness;
  (c) third means in said extrusion head downstream of said second means for splitting said annular extrudate longitudinally along one generatrix of said annular configuration;
  (d) fourth means defining in said extrusion head downstream of said third means a transition zone having first and second wall surfaces approximating the contours of the internal and external wall surfaces, respectively, of a tube split from adjacent one end along one generatrix and gradually unfolded to a desired terminal shape at its other end, whereby said transition zone is operable to unfold said split annular extrudate into said terminal shape; and
  (e) fifth means defining an exit zone through which said extrudate leaves said extrusion head;
  (f) whereby said extrudate arrives at said exit zone with a constant shear history and under constant pressure across the entire terminal shape of the extrudate and with all particles of the extrudate having travelled paths of the same length from said entrance zone to said exit zone.

2. An extrusion head as claimed in claim 1, wherein said second means comprises a mandrel projecting from one of said wall surfaces of said fourth means in a direction opposite to the direction of flow of said extrudate through said entrance zone.

3. An extrusion head as claimed in claim 1, wherein said third means comprises a divider projecting from one of said wall surfaces in said transition zone toward the other.

4. An extrusion head as claimed in claim 1, wherein the spacing of said first and second wall surfaces in said transition zone from one another as measured normal to said wall surfaces at every point along the path of flow of said extrudate therebetween remains constant and is equal to the wall thickness of said annular extrudate formed by said second means.

5. An extrusion head as claimed in claim 1, wherein the spacing of said first and second wall surfaces in said transition zone from one another as measured normal to said wall surfaces varies between at least two points along the path of flow of said extrudate therebetween but is constant transverse to the direction of extrudate flow at all points equidistant from said entrance zone.

6. An extrusion head as claimed in claim 1, wherein at least said fifth means is constructed to impart to said exit zone a cross-sectional configuration corresponding to the desired terminal shape of said unfolded extrudate.

* * * * *